(12) United States Patent
Tadano

(10) Patent No.: US 8,927,155 B2
(45) Date of Patent: Jan. 6, 2015

(54) NON-AQUEOUS ELECTROLYTE SECONDARY BATTERY AND PRODUCING METHOD OF ELECTRODE

(75) Inventor: Junichi Tadano, Fukushima (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 12/199,227

(22) Filed: Aug. 27, 2008

(65) Prior Publication Data

US 2009/0061313 A1  Mar. 5, 2009

(30) Foreign Application Priority Data

Aug. 28, 2007 (JP) ................................. 2007-221043

(51) Int. Cl.
| H01M 4/13 | (2010.01) |
| H01M 2/34 | (2006.01) |
| H01M 4/139 | (2010.01) |
| H01M 4/62 | (2006.01) |
| H01M 10/058 | (2010.01) |

(52) U.S. Cl.
CPC H01M 4/13 (2013.01); H01M 2/34 (2013.01); H01M 4/139 (2013.01); H01M 4/62 (2013.01); H01M 10/058 (2013.01); H01M 2200/00 (2013.01); Y02E 60/122 (2013.01)
USPC .......................................... 429/246; 429/217

(58) Field of Classification Search
USPC ................................................ 429/121–347
See application file for complete search history.

(56) References Cited

U.S. PATENT DOCUMENTS

| 2002/0048704 A1* | 4/2002 | Murai et al. ................... 429/144 |
| 2002/0160268 A1* | 10/2002 | Yamaguchi et al. .......... 429/254 |
| 2002/0161323 A1* | 10/2002 | Miller et al. ..................... 604/20 |
| 2006/0188785 A1* | 8/2006 | Inoue et al. .................... 429/246 |
| 2007/0015053 A1* | 1/2007 | Morris ........................... 429/212 |
| 2008/0274411 A1* | 11/2008 | Nakajima et al. ............. 429/322 |

FOREIGN PATENT DOCUMENTS

| JP | 7-220759 | 8/1995 | |
| JP | 09-147916 | 6/1997 | |
| JP | 10-214640 | 8/1998 | |
| JP | 2000-198899 | 7/2000 | |
| JP | 2000-235868 | 8/2000 | |
| JP | 2002-170541 | 6/2002 | |
| JP | 2003-297332 | 10/2003 | |
| JP | 2005-285605 | 10/2005 | |
| KR | 2007-0011443 A * | 1/2007 | ........ H01M 10/0525 |

OTHER PUBLICATIONS

Japanese Office Action issued on Oct. 20, 2009, for corresponding Japanese Patent Application JP 2007-221043.

* cited by examiner

*Primary Examiner* — Kenneth Douyette
*Assistant Examiner* — James Lee
(74) *Attorney, Agent, or Firm* — K&L Gates LLP

(57) ABSTRACT

A non-aqueous electrolyte secondary battery includes a positive electrode, a negative electrode, an electrolyte, and a porous protective film formed on either one or both surfaces of the positive and negative electrodes. The porous protective film includes a binder, fine particles, and a surfactant.

15 Claims, 3 Drawing Sheets

NON-AQUEOUS ELECTROLYTE SECONDARY BATTERY AND PRODUCING METHOD OF ELECTRODE

CROSS-REFERENCE TO RELATED APPLICATIONS

The present application claims priority to Japanese Patent Application No. 2007-221043 filed in the Japanese Patent Office on Aug. 28, 2007, the entire disclosure of which is incorporated herein by reference.

BACKGROUND

The present application relates to a non-aqueous electrolyte secondary battery and a method for producing an electrode.

In recent years, as electronic technology has advanced, various electronic devices are improved in performance and further reduced in size and can be portable. As a result, a demand for battery used to such electronic devices, which has a higher energy density, has been increased. As a secondary battery for electronic device, aqueous electrolyte secondary batteries, such as a nickel-cadmium battery and a lead battery, have been used. These secondary batteries have a low terminal voltage at discharging and are unsuitable for obtaining a high energy density.

Recently, with respect to the secondary battery as a substitute for the nickel-cadmium battery and the like, research and development are vigorously made on a non-aqueous electrolyte secondary battery using as an anode active material capable of being doped/dedoped with/from a lithium ion, such as a carbon material, using as a cathode active material a lithium composite oxide, such as a lithium-cobalt composite oxide, and using as an electrolyte a non-aqueous electrolytic solution obtained by dissolving a lithium salt in a non-aqueous solvent.

This secondary battery has advantages in that the battery voltage is high and the self-discharge is small, making it possible to achieve high energy density. When the carbon material or lithium composite oxide is actually used as an active material, the material and the oxide are processed into powder each having an average particle size of 5 to 50 µm, and the powder and a binder are dispersed in a solvent to prepare an anode mixture slurry and a cathode mixture slurry, respectively. The resultant slurries are then applied to metallic foils as current collectors to form an anode active material layer and a cathode active material layer, respectively. A separator is disposed between the resultant negative electrode and positive electrode respectively having the anode active material layer and cathode active material layer on the current collector to separate the electrodes from each other, and they are placed in a battery can.

With respect to the non-aqueous electrolyte secondary battery described above, it should be noted that the non-aqueous electrolytic solution used in the non-aqueous electrolyte secondary battery has an electric conductivity smaller than that of an aqueous electrolytic solution by about double figures. Accordingly, for obtaining satisfactory battery performance, it would be desirable that the non-aqueous electrolyte secondary battery has a structure such that the electrolyte moves as easily as possible. For this reason, in the non-aqueous electrolyte secondary battery, a very thin separator having a thickness as small as about 10 to 50 µm is used as a separator for separating the positive electrode and the negative electrode from each other.

As described above, in the non-aqueous electrolyte secondary battery, the electrodes are individually prepared by applying a mixture slurry containing an active material in a powder form to a current collector to form an active material layer on the current collector, and then they are placed in a battery can. In this instance, before placed in the battery can, the electrode having an active material layer formed thereon is subjected to various steps, such as a step for stacking the electrodes and separator on one another, and a step for cutting the electrode into a predetermined electrode form.

The active material is fallen from the active material layer which is in contact with a guide roll or the like during running of the electrode raw sheet, and part of the fallen active material disadvantageously adheres back to the surface of the electrode, or metal fine particles caused in the step for placing the stacked electrodes in a battery can are disadvantageously mixed into the battery. The fallen active materials put on the surface of the electrode or the metal fine particles mixed into the battery have a particle size of 5 to 200 µm, which is equal to or larger than the thickness of the separator, and therefore they penetrate the separator in the battery assembled, thereby causing a physical internal short-circuiting.

For solving the situation, a method has been proposed in which a fine particle slurry is applied to at least one of the surface of the anode active material layer and the surface of the cathode active material layer and dried to form a porous protective film (see, for example, Japanese Unexamined Patent Application Publication No.H07-220759). A known porous protective film has a gas permeability of about 680 sec/100 ml.

SUMMARY

In the known technique, however, upon applying the fine particle slurry forming a porous protective film to at least one of the surface of the anode active material layer and the surface of the cathode active material layer, the fine particle slurry permeates the active material layer to some extent to expel the air contained in the active material layer, and therefore a region in which the active material layer is not covered with the porous protective film to expose the surface (hereinafter, frequently referred to as "repellency") is disadvantageously caused. When the repellency is caused and the fallen active material or metal fine particles are mixed into the battery, internal short-circuiting may occur.

Accordingly, it is desirable to provide a non-aqueous electrolyte secondary battery which is advantageous in that the battery has high reliability such that the occurrence of physical internal short-circuiting due to exposure of the electrode surface can be prevented, and a method for producing an electrode.

The present inventor has conducted studies with a view toward solving the problem of repellency of the slurry on the surface of the electrode. As a result, it has been found that, the addition of a surfactant to the fine particle slurry provides an improved affinity between the fine particle slurry and the surface of the active material layer, making it possible to reduce the occurrence of repellency.

In accordance with one aspect of the present application, a non-aqueous electrolyte secondary battery is provided which includes: a positive electrode, a negative electrode, an electrolyte, and a porous protective film formed on either one or both surfaces of the positive and the negative electrodes. The porous protective film includes a binder, fine particles, and a surfactant.

In accordance with another aspect of the present application, a producing method of an electrode is provided which includes: mixing together a cathode active material, a conductive material, and a binder to prepare a cathode mixture, dispersing the cathode mixture in a solvent to form a cathode slurry, applying the cathode slurry to a positive electrode collector, and drying the cathode slurry applied; mixing together an anode active material and a binder to prepare an anode mixture, dispersing the anode mixture in a solvent to form an anode slurry, applying the anode slurry to a negative electrode collector, and drying the anode slurry applied, mixing together a binder, fine particles, a surfactant, and a solvent to prepare a fine particle slurry; and applying the fine particle slurry to either one or both of surfaces of the positive and negative electrodes and drying the slurry applied.

According to an embodiment, a binder, fine particles, a surfactant, and a solvent are mixed together to prepare a fine particle slurry and the fine particle slurry is applied to an electrode, and the electrode is surely covered with the fine particle slurry, thereby preventing the electrode surface from being exposed.

Additional features and advantages are described herein, and will be apparent from the following Detailed Description and the figures.

DETAILED DESCRIPTION

Figure 1:
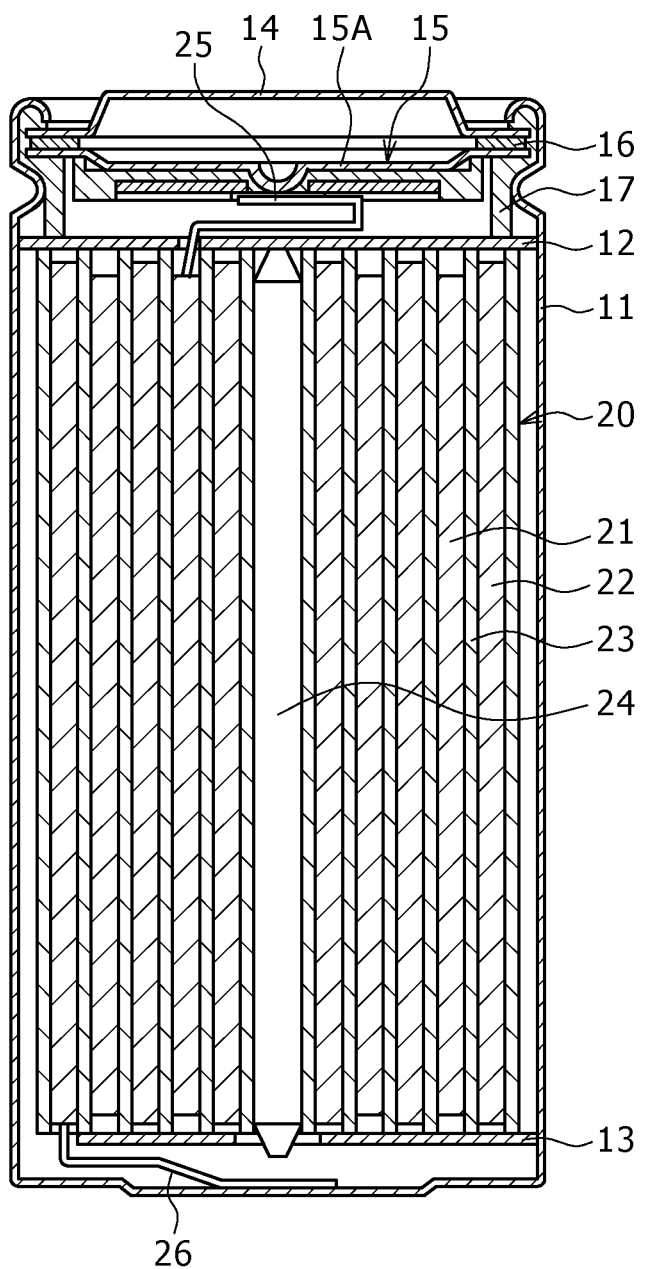
FIG. 1 is a diagrammatic cross-sectional view showing an example of the construction of a non-aqueous electrolyte secondary battery according to a first embodiment.

Embodiments of the present application will be described in detail with reference to the accompanying drawings. In the following embodiments, in the drawings, like parts or portions are indicated by like reference numerals.

(1) First Embodiment (1-1) Construction of Secondary Battery

FIG. 1 is a cross-sectional view showing an example of the construction of a non-aqueous electrolyte secondary battery according to a first embodiment. This non-aqueous electrolyte secondary battery is of a so-called cylinder type, and has a spirally-wound electrode body 20 in a substantially hollow and cylindrical battery can 11. The spirally-wound electrode 20 includes a strip positive electrode 21, a strip negative electrode 22, and a separator 23 disposed between the positive and negative electrodes in which they are spirally wound together. A porous protective film is formed on either one or both of the positive electrode surface and the negative electrode surface. The separator 23 is impregnated with an electrolytic solution as an electrolyte. The battery can 11 is composed of, for example, iron (Fe) plated with nickel (Ni), and has one closed end and another open end. In the battery can 11, a pair of insulating sheets 12, 13 are disposed in the direction perpendicular to the winding electrode structure so that the spirally-wound electrode 20 is sandwiched between the insulating sheets.

A battery cap (top cover) 14, and a safety vent mechanism 15 and a positive temperature coefficient (PTC) element 16 disposed inner side of the battery cap 14 are fitted to the open end of the battery can 11 by caulking through a sealing gasket 17, and the inside of the battery can 11 is sealed. The battery cap 14 is composed of, for example, a similar material to the battery can 11. The safety vent mechanism 15 is electrically connected to the battery cap 14 through the PTC element 16, and has a mechanism such that a disc 15A turns round to cut the electrical connection between the battery cap 14 and the spirally-wound electrode body 20 when the internal pressure of the battery is increased to a predetermined value or higher due to internal short-circuiting, exposure to high-temperature heat from an external heat source, or the like. The PTC element 16 increases in electrical resistance to cut off the electric current flowing the battery when the temperature of the battery is increased, preventing rapid temperature elevation due to the increased current. The sealing gasket 17 is composed of, for example, an insulating material, and has a surface coated with asphalt.

The spirally-wound electrode body 20 is spirally wound round, for example, a center pin 24. A positive electrode lead 25 formed of aluminum or the like is connected to the positive electrode 21 of the spirally-wound electrode body 20, and a negative electrode lead 26 formed of nickel or the like is connected to the negative electrode 22. The positive electrode lead 25 is electrically connected to the battery cap 14 by welding to the safety vent mechanism 15, and the negative electrode lead 26 is electrically connected to the battery can 11 by welding thereto.

Figure 2:
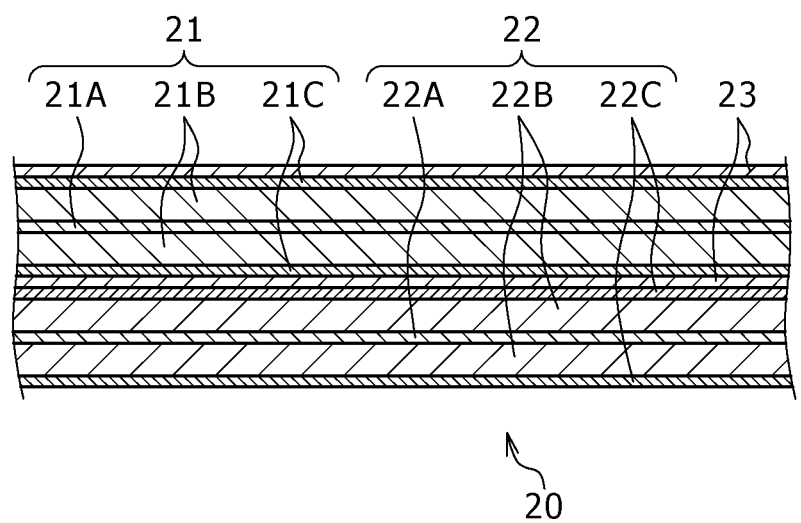
FIG. 2 is a partially enlarged, diagrammatic cross-sectional view of the spirally-wound electrode body shown in FIG. 1.

FIG. 2 is a partially enlarged cross-sectional view of the spirally-wound electrode body 20 shown in FIG. 1. Hereinbelow, the positive electrode 21, negative electrode 22, separator 23, and electrolytic solution constituting the secondary battery are individually described with reference to FIG. 2. In the following descriptions, an example in which a porous protective film is formed on both the positive electrode surface and the negative electrode surface is described, but a porous protective film may be formed on one of the positive electrode surface and the negative electrode surface.

Positive Electrode

The positive electrode 21 has a structure such that, for example, a cathode active material layer 21B is formed on both surfaces of a positive electrode collector 21A having a pair of surfaces opposite to each other. The cathode active material layer 21B may be formed only on one surface of the positive electrode collector 21A. The positive electrode collector 21A is composed of a metallic foil, such as an aluminum foil. The cathode active material layer 21B includes, for example, as a cathode active material, one or more types of cathode materials being capable of having lithium occluded/released, and optionally a conductor, such as graphite, and a binder, such as polyvinylidene fluoride. With respect to the binder, carboxymethyl cellulose (CMC) or a rubber binder such as a styrene-butadiene rubber (SBR) may be used.

With respect to the cathode active material, any known cathode material capable of being doped/dedoped with/from lithium and containing a satisfactory amount of lithium may be used. Specifically, a composite metal oxide represented by the formula: $LiMO_2$ (wherein M contains at least one member selected from Co, Ni, Mn, Fe, Al, V, and Ti) including lithium and a transition metal, or an intercalation compound including lithium is preferably used. Alternatively, $Li_aMX_b$ (wherein M represents a transition metal, X is selected from S, Se, and $PO_4$, and each of a and b is an integer>0) may be used. Especially, a lithium composite oxide represented by $Li_xMIO_2$ or $Li_yMII_2O_4$ is preferably used as a cathode active material. The battery using the lithium composite oxide can generate a high voltage, thereby increasing the energy density. In these compositional formulae, MI represents at least one transition metal element, preferably at least one of cobalt (Co) and nickel (Ni). MII represents at least one transition metal element, preferably manganese (Mn). Each of x and y varies depending on the charged or discharged state of the battery, and is generally in the range of from 0.05 to 1.10. Specific examples of the lithium composite oxides include $LiCoO_2$, $LiNiO_2$, $LiNi_zCo_{1-z}O_2$ (wherein 0<z<1), and $LiMn_2O_4$.

Figure 3:
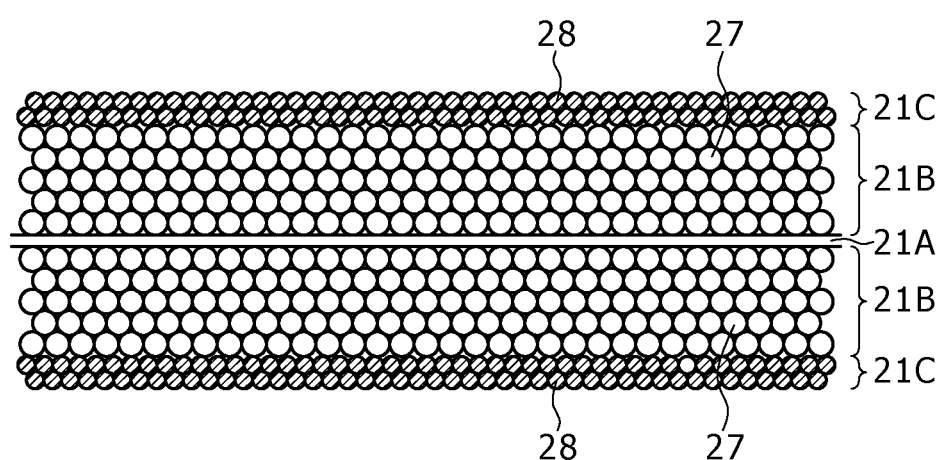
FIG. 3 is a partially enlarged, diagrammatic cross-sectional view of the positive electrode shown in FIG. 1.

FIG. 3 is a partially enlarged cross-sectional view of the positive electrode 21 shown in FIG. 1. A porous protective film 21C is formed on one surface or both surfaces of the positive electrode 21. The porous protective film 21C includes a binder, fine particles, and a surfactant.

With respect to the porous protective film 21C, for example, fine particles, a binder, and a surfactant are dispersed in a solvent to prepare a fine particle slurry, and the fine particle slurry is applied to the positive electrode to form a coating film, and the coating film is used as a porous protective film. When the protective film is porous, the function of the electrode, i.e., reaction between the electrode and the electrolyte ions contained in the electrolytic solution is not inhibited. It is preferred that the porous protective film 21C has a thickness in the range of from 0.1 to 200 μm. When the porous protective film 21C has a thickness of less than 0.1 μm, it is difficult to exhibit a satisfactory protection effect, making it difficult to prevent the occurrence of physical internal short-circuiting. On the other hand, when the porous protective film 21C has a thickness of more than 200 μm, the porous protective film 21C inhibits the reaction between the electrode and ions contained in the electrolytic solution, lowering the battery performance.

With respect to the binder, there is no particular limitation as long as it has a resistance to the electrolytic solution. For example, a fluororesin and a rubber resin may be used individually or in combination, and it is preferred that a fluororesin and a rubber resin are used in combination. When a fluororesin and a rubber resin are used in combination, a porous protective film having both flexibility and high strength may be formed. With respect to the fluororesin, for example, polyvinylidene fluoride (PVdF) may be used. With respect to the rubber resin, for example, at least one member selected from the group consisting of a styrene-butadiene rubber (SBR), an acrylic rubber, and a butadiene rubber can be used. It is preferred that the fluororesin (A):rubber resin (B) mass ratio A:B is 1:9 to 9:1. When the fluororesin ratio is smaller than the above range, it is difficult to keep the satisfactory strength by the resultant porous protective film, so that the resistance to physical short-circuiting is likely to be poor when foreign matter is contained in the battery. On the other hand, when the fluororesin ratio is larger than the above range, the resultant porous protective film may lose flexibility, and hence the active material is likely to be fallen from the active material layer which is in contact with a guide roll or the like during running of the electrode raw sheet, and part of the fallen active material adheres back to the surface of the electrode, causing physical internal short-circuiting.

With respect to the surfactant, for example, at least one member selected from the group consisting of sodium dodecylsulfate, lithium dodecylsulfate, and sodium hexametaphosphate may be used. Fine particles 28 include, for example, a metal oxide. With respect to the metal oxide, for example, a metal oxide including at least one member selected from the group consisting of alumina, titania, zirconia, and silica may be used.

With respect to the fine particles 28, from the viewpoint of preventing the occurrence of physical or chemical internal short-circuiting, insulating fine particles are used, and the use of alumina powder, in particular, is preferably. The fine particles 28 may have a particle size in the range of, for example, 0.1 to 50 μm, preferably 0.1 to 1.0 μm. When the fine particles 28 having a particle size of 0.1 to 1.0 μm are used, the following advantages is obtained: (1) penetration of the electrolytic solution into the porous protective film 21C is facilitated; (2) a porous protective film having an appropriate thickness is obtained, and hence the occurrence of physical internal short-circuiting is prevented, improving the safety of battery; and (3) a protective film gas permeability of 4 to 600 sec/100 ml is achieved, whereby lowering of the discharge capacity retention ratio of the battery may be suppressed. Further, it is preferred that the fine particles 28 are insoluble in the non-aqueous solvent of the electrolytic solution.

It is preferred that the total gas permeability of the porous protective film 21C and the porous protective film 22C is 4 to 600 sec/100 ml. When the porous protective film is formed on either one of the positive electrode surface and the negative electrode surface, it is preferred that the porous protective film formed on either one of the positive electrode surface and the negative electrode surface solely has a gas permeability of 4 to 600 sec/100 ml. When the gas permeability is less than 4 sec/100 ml, the safety of the battery is degraded. On the other hand, when the gas permeability is more than 600 sec/100 ml, the discharge capacity retention ratio of the battery is markedly lowered.

Negative Electrode

The negative electrode 22 has a structure such that, for example, an anode active material layer 22B is formed on both surfaces of a negative electrode collector 22A having a pair of surfaces opposite to each other. The negative electrode may have a not shown structure such that the anode active material layer 22B is formed only on one surface of the negative electrode collector 22A. The negative electrode collector 22A is composed of a metallic foil, such as a copper foil.

The anode active material layer 22B includes as an anode active material at least one anode material being capable of having lithium occluded/released, and optionally a similar binder to that used in the cathode active material layer 21B.

In this secondary battery, the electrochemical equivalent of the anode material being capable of having lithium occluded/released is larger than the electrochemical equivalent of the positive electrode 21 so that lithium metal is not deposited on the negative electrode 22 during the charging of the battery.

With respect to the anode active material, for example, a carbon material capable of being doped/dedoped with/from lithium, a crystalline or amorphous metal oxide, or the like is used. Examples of carbon materials include hardly graphitizable carbon materials, such as coke and glassy carbon, and graphite, such as highly crystalline carbon materials having advanced crystal structure, and specific examples include pyrolytic carbon, coke (e.g., pitch coke, needle coke, and petroleum coke), graphite, glassy carbon, calcined products of polymer compound (obtained by carbonizing a phenolic resin, a furan resin, or the like by calcination at an appropriate temperature), carbon fiber, and activated carbon.

With respect to the anode material being capable of having lithium occluded/released, examples include materials being capable of having lithium occluded/released and including at least one member of a metal element and a semi-metal element as a constituent element. When using such a material, high energy density can be obtained. Especially when the above material and a carbon material are used in combination, not only high energy density but also excellent cycle characteristics can be advantageously obtained. The anode material may be composed of a metal element or a semi-metal element, or an alloy thereof or a compound thereof, or may have at least one phase of the above element in at least part of the anode material. In an embodiment, the alloy encompasses an alloy including two metal elements or more and an alloy including at least one metal element and at least one semi-metal element. The alloy may contain a nonmetal element. In the system of alloy, a solid solution, an eutectic crystal (eutectic mixture), an intermetallic compound, or a combination thereof may coexist.

Examples of metal elements or semi-metal elements constituting the anode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These may be either crystalline or amorphous.

Of these, preferred is the anode material including a metal element or semi-metal element belonging to Group 4B in the short-form periodic table as a constituent element, and especially preferred is the anode material including at least one of silicon (Si) and tin (Sn) as a constituent element. Each of silicon (Si) and tin (Sn) has an excellent ability to have lithium (Li) occluded/released, making it possible to achieve high energy density.

Examples of tin (Sn) alloys include alloys including, as the second constituent element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of silicon (Si) alloys include alloys including, as the second constituent element other than silicon (Si), at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of tin (Sn) compounds or silicon (Si) compounds include those containing oxygen (O) or carbon (C), and these compounds may contain the above-mentioned second constituent element in addition to tin (Sn) or silicon (Si).

With respect to the anode material being capable of having lithium occluded/released, further examples include other metal compounds and polymer materials. Examples of other metal compounds include oxides, such as $MnO_2$, $V_2O_5$, and $V_6O_{13}$, sulfides, such as NiS and MoS, and lithium nitrides, such as $LiN_3$, and examples of polymer materials include polyacetylene, polyaniline, and polypyrrole.

A porous protective film 22C is formed on one surface or both surfaces of the negative electrode 22. The porous protective film 22C is similar to the above-described porous protective film 21C in the positive electrode 21.

Separator

With respect to the separator 23, any material can be used as long as it is electrically stable and chemically stable to the cathode active material, anode active material, and solvent and has no electric conductivity. For example, polymer non-woven fabric or porous film or paper composed of glass or ceramic fibers can be used, and a multilayer stacked film composed of the above material may be used. Especially, a porous polyolefin film is preferably used, and a composite of the porous polyolefin film and a heat-resistant material formed of polyimide, glass or ceramic fibers, or the like may be used.

Electrolytic Solution

The electrolytic solution, which serves as an electrolyte, is obtained by dissolving, for example, a lithium salt as an electrolyte salt in a solvent. With respect to the solvent, preferred is an organic solvent, i.e., a non-aqueous solvent, such as propylene carbonate, ethylene carbonate, diethyl carbonate, dimethyl carbonate, methylethyl carbonate, γ-butyrolactone, tetrahydrofuran, 1,2-dimethoxyethane, 1,3-dioxolane, 4-methyl-1,3-dioxolane, diethyl ether, sulfolane, methyl sulfolane, acetonitrile, or propionitrile, and these solvents may be used individually or in combination.

(1-2) Method for Producing a Secondary Battery

A non-aqueous electrolyte secondary battery having the above-described construction is produced, for example, as follows. A cathode active material, a conductor, and a binder are mixed together to prepare an anode mixture, and the resultant anode mixture is dispersed in a solvent, such as 1-methyl-2-pyrrolidone, to prepare an anode mixture slurry. Then, the anode mixture slurry is applied to the positive electrode collector 21A, and dried to remove the solvent, and then subjected to compression molding by means of a roller press or the like to form a cathode active material layer 21B, thus preparing a positive electrode 21. An anode active material and a binder are mixed together to prepare a cathode mixture, and the resultant cathode mixture is dispersed in a solvent, such as 1-methyl-2-pyrrolidone, to prepare a cathode mixture slurry. Then, the cathode mixture slurry is applied to a negative electrode collector 22A, and dried to remove the solvent, and then subjected to compression molding by means of a roller press or the like to form an anode active material layer 22B, thus preparing a negative electrode 22.

Then, for example, a binder, fine particles, and a surfactant are dispersed in a solvent to prepare a fine particle slurry. It is preferred that the content of the surfactant in the fine particle slurry is 0.01 to 3.0% by mass. If the surfactant content of the slurry is less than 0.01% by mass, the occurrence of repellency of the slurry may not be satisfactorily prevented. On the other hand, if the surfactant content of the slurry is more than 3.0% by mass, a great amount of air bubbles may be formed during the preparation of the fine particle slurry. As a result, it would be difficult to prepare the fine particle slurry. From the viewpoint of facilitating the step for mixing the fine particle slurry, the surfactant content of the slurry is preferably about 0.05 to 1.0% by mass. Further, appropriately controlling the concentration of the fine particle slurry can suppress the repellency of the slurry on the electrode surface.

It is preferred that the fine particle slurry has a viscosity in the range of from 0.1 to 3.5 Pa·sec. If the slurry has a higher viscosity, the occurrence of repellency of the slurry may be more surely prevented. From the viewpoint of the step of applying the fine particle slurry utilizing a coating gap, the fine particle slurry preferably has a viscosity of about 0.2 to 1.0 Pa·sec. If the viscosity of the fine particle slurry is less than 0.2 Pa·sec, the fine particle slurry is likely to permeate the surface of the active material layer, making it difficult to form a satisfactory porous film of fine particles. On the other hand, if the viscosity of the slurry is more than 1.0 Pa·sec, the fine particle slurry is unlikely to uniformly spread with respect to the coating gap, making it difficult to form a uniform porous film of fine particles.

It is preferred that the total solid content of the fine particle slurry is in the range of from 3 to 25% by mass. If the fine particle slurry has a total solid content of less than 3% by mass, the fine particles in the fine particle slurry undergo precipitation or aggregation, making it impossible to form a stable fine particle slurry. On the other hand, if the fine particle slurry has a total solid content of more than 25% by mass, the particles together form a solid, it is difficult to form a slurry. The total solid content of the fine particle slurry means the sum total of solid content in the slurry, excluding the solvent, for example, the sum total of a binder, fine particles, and a surfactant in the slurry.

Next, the fine particle slurry is applied to at least one of the surface of the cathode active material layer and the surface of the anode active material layer. The binder contained in the fine particle slurry gathers around the contact interfaces between the fine particles or the contact interfaces between the fine particles and the active material layer, so that portions other than the contact interfaces constitute pores, thus forming a porous protective film having a number of pore portions.

Then, a positive electrode lead 25 is fitted to the positive electrode collector 21A by welding or the like, and a negative electrode lead 26 is fitted to the negative electrode collector 22A by welding or the like. Then, a separator 23 is disposed between the positive electrode 21 and the negative electrode 22 and they are together spirally wound, and the end of the positive electrode lead 25 is welded to a safety vent mechanism 15 and the end of the negative electrode lead 26 is welded to a battery can 11, and the positive electrode 21 and negative electrode 22 spirally wound are sandwiched between a pair of insulating sheets 12, 13 and placed in the battery can 11. The positive electrode 21 and negative electrode 22 are placed in the battery can 11, and then an electrolytic solution is injected into the battery can 11 so that the separator 23 is impregnated with the electrolytic solution. Then, the battery cap 14, safety vent mechanism 15, and PTC element 16 are fixed to the open end of the battery can 11 through a sealing gasket 17 by caulking, thus completing a non-aqueous electrolyte secondary battery shown in FIG. 1.

As described above, according to the first embodiment, the porous protective film is formed on either one of both of the cathode active material layer surface and the anode active material layer surface. Accordingly, even if the active material is fallen from the active material layer or fine particles or metal leaves are mixed into the battery after the active material layer is formed and before the electrodes are placed in a battery can, the occurrence of physical internal short-circuiting due to such foreign matter can be prevented. Thus, the battery can be improved in reliability.

Further, in the first embodiment, a binder, fine particles, a surfactant, and a solvent are mixed together to prepare a fine particle slurry and the fine particle slurry is applied to an electrode, and hence the electrode is surely covered with the fine particle slurry to prevent the electrode surface from being exposed. Accordingly, the occurrence of physical internal short-circuiting due to exposure of the surface of the active material layer can be prevented, thus further improving the battery in reliability.

When the fine particle slurry or porous protective film having appropriate physical properties is selected, the battery can be improved in reliability or safety without sacrificing the battery properties. For example, when the gas permeability of the porous protective film is controlled to be in the range of from 4 to 600 sec/100 ml, the discharge capacity retention ratio after the cycle test is equivalent to or more excellent than that of a battery having no porous protective film. Thus, the occurrence of internal short-circuiting is prevented without sacrificing the battery performance, thereby obtaining a battery having high reliability and excellent safety.

(2) Second Embodiment (2-1) Construction of Secondary Battery

Figure 4:
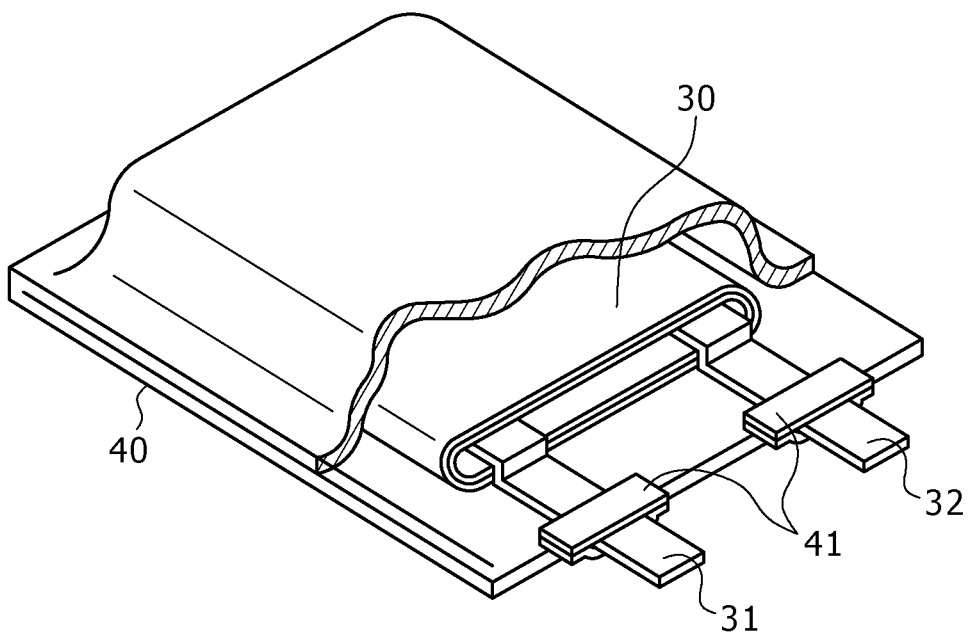
FIG. 4 is a perspective view showing an example of the construction of a non-aqueous electrolyte secondary battery according to a second embodiment.

FIG. 4 is a perspective view showing an example of the construction of a non-aqueous electrolyte secondary battery according to a second embodiment of the present application. In the non-aqueous electrolyte secondary battery, a spirally-wound electrode body 30 having fitted thereto a positive electrode lead 31 and a negative electrode lead 32 is contained in a film-form covering member 40. Thus, the battery can be easily reduced in size, weight, and thickness.

The positive electrode lead 31 and negative electrode lead 32 are electrically derived from the inside of the covering member 40 to the outside, respectively, in the same direction, for example. Each of the positive electrode lead 31 and the negative electrode lead 32 is composed of a metal material, such as aluminum (Al), copper (Cu), nickel (Ni), or stainless steel, and is in the form of a thin sheet or mesh.

The covering member 40 is composed of, for example, a rectangular aluminum laminated film including a nylon film, an aluminum foil, and a polyethylene film, which are laminated together in this order. The covering member 40 is arranged so that, for example, the polyethylene film and the spirally-wound electrode body 30 face each other, and the outer edges of the covering member are sealed by heat sealing or using a bonding agent. An adhesion film 41 for preventing air from going into the battery is placed between the covering member 40 and the positive electrode lead 31 and between the covering member 40 and the negative electrode lead 32. The adhesion film 41 is composed of a material having adhesion properties to the positive electrode lead 31 and negative electrode lead 32, e.g., a polyolefin resin, such as polyethylene, polypropylene, modified polyethylene, or modified polypropylene.

The covering member 40 may be composed of, instead of the aluminum laminated film described above, a laminated film having another structure, a polymer film of polypropylene or the like, or a metal film.

Figure 5:
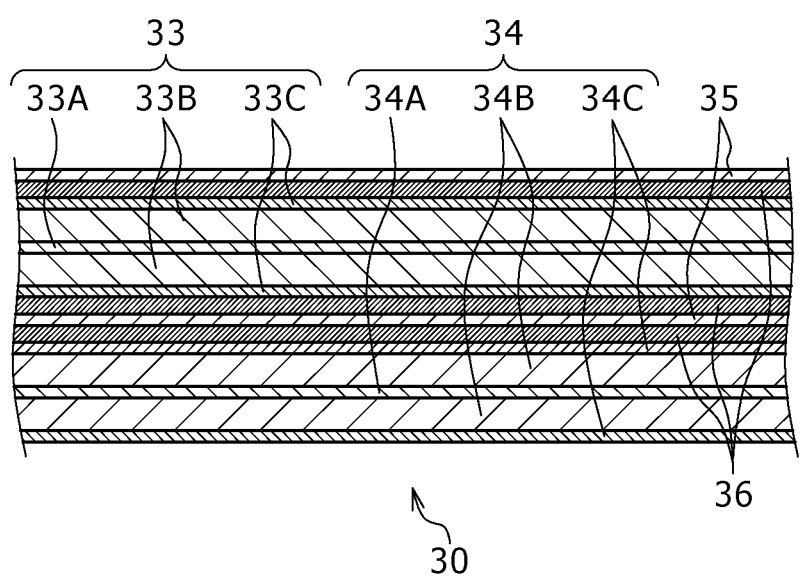
FIG. 5 is a partially enlarged, diagrammatic cross-sectional view of the spirally-wound electrode body shown in FIG. 4.

FIG. 5 is a partially enlarged cross-sectional view of the spirally-wound electrode body 30 shown in FIG. 4. The spirally-wound electrode body 30 includes a positive electrode 33, a negative electrode 34, a separator 35, and an electrolyte layer 36. The separator and electrolyte layer are disposed between the positive electrode and the negative electrode and they are together spirally wound. The electrode structure has the outermost layer protected by a protective tape.

The positive electrode 33 includes a cathode active material layer 33B formed on one surface or both surfaces of the positive electrode collector 33A. A porous protective film 33C is formed on one surface or both surfaces of the positive electrode 33. The negative electrode 34 includes an anode active material layer 34B formed on one surface or both surfaces of the negative electrode collector 34A. The anode active material layer 34B and the cathode active material layer 33B are disposed so that they are opposite to each other. A porous protective film 34C is formed on one surface or both surfaces of the negative electrode 34. In the present embodiment, an example in which a porous protective film is formed on both the surface of the positive electrode and the surface of the negative electrode is described, but a porous protective film may be formed on one of the surface of the positive electrode and the surface of the negative electrode.

The constructions of the positive electrode collector 33A, cathode active material layer 33B, porous protective film 33C, negative electrode collector 34A, anode active material layer 34B, porous protective film 34C, and separator 35 are the same as those of the positive electrode collector 21A, cathode active material layer 21B, porous protective film 21C, negative electrode collector 22A, anode active material layer 22B, porous protective film 22C, and separator 23, respectively, which is described above in connection with the first embodiment.

The electrolyte layer 36 includes an electrolytic solution and a polymer compound as a support material for holding the electrolytic solution, and is in the form of a so-called gel. The gel electrolyte layer 36 advantageously not only achieves high ion conductivity but also prevents the electrolytic solution from leaking from the battery. The constituents of the electrolytic solution (i.e., solvent, electrolyte salt, and the like) are the same as those mentioned above in the non-aqueous electrolyte secondary battery according to the first embodiment. Examples of polymer compounds include polyacrylonitrile, polyvinylidene fluoride, copolymers of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubbers, nitrile-butadiene rubbers, polystyrene, and polycarbonate. Particularly, from the viewpoint of achieving excellent electrochemical stability, preferred is polyacrylonitrile, polyvinylidene fluoride, polyhexafluoropropylene, polyethylene oxide, or the like.

(2-2) Method for Producing a Secondary Battery

A non-aqueous electrolyte secondary battery having the above-described construction is produced, for example, as follows. First, a precursor solution including a solvent, an electrolyte salt, a polymer compound, and a mixed solvent is applied to each of the positive electrode 33 and the negative electrode 34, and the mixed solvent is volatilized to form an electrolyte layer 36. Subsequently, a positive electrode lead 31 is fitted to the end of the positive electrode collector 33A by welding or the like, and a negative electrode lead 32 is fitted to the end of the negative electrode collector 34A by welding or the like. Then, a separator 35 is disposed between the positive electrode 33 and the negative electrode 34 each having formed thereon the electrolyte layer 36 and they are stacked on one another to form a stacked structure, and then the stacked structure is spirally wound in the longitudinal direction, and a protective tape is bonded to the outermost layer to form a spirally-wound electrode body 30. Finally, for example, the spirally-wound electrode body 30 is disposed in a folded covering member 40, and the outer edges of the covering member 40 are sealed by heat sealing or the like. In this instance, an adhesion film 41 is placed between the positive electrode lead 31 and the covering member 40 and between the negative electrode lead 32 and the covering member 40, thus obtaining a non-aqueous electrolyte secondary battery shown in FIG. 4.

Alternatively, this non-aqueous electrolyte secondary battery may be produced as follows. The positive electrode 33 and negative electrode 34 are first prepared as described above, and a positive electrode lead 31 and a negative electrode lead 32 are fitted to the positive electrode 33 and negative electrode 34, respectively, and then a separator 35 is disposed between the positive electrode 33 and the negative electrode 34 and they are stacked on one another and together spirally wound, and a protective tape is bonded to the outermost layer to form a spirally-wound structure which is a precursor of the spirally-wound electrode body 30. Then, the spirally-wound structure is disposed in a folded covering member 40, and the outer edges of the covering member are heat-sealed, excluding the edge on one side, so that the spirally-wound structure is contained in the covering member 40 in a bag form. Then, a composition for electrolyte, which includes a solvent, an electrolyte salt, monomers as a raw material for polymer compound, a polymerization initiator, and optionally other materials, such as a polymerization inhibitor, is prepared, and injected into the covering member 40.

The composition for electrolyte is injected and then the opening of the covering member 40 is sealed by heat sealing in a vacuum atmosphere. Then, the monomers are polymerized by applying heat into a polymer compound to form a gel electrolyte layer 36, thus obtaining a non-aqueous electrolyte secondary battery shown in FIG. 4.

The effects of the second embodiment are the same as those obtained in the first embodiment.

EXAMPLES

Hereinbelow, embodiments of the present application will be described in more detail with reference to the following Examples, which should not be construed as limiting the scope of the present application.

Examples 1 to 7

A negative electrode was first prepared as follows. 98 Parts by mass of soft graphite as an anode active material and 2 parts by mass of a styrene-butadiene rubber (SBR) as a binder were mixed together to prepare a cathode mixture. The resultant cathode mixture was dispersed in ion-exchanged water as a solvent to prepare a cathode mixture slurry. Then, the cathode mixture slurry was applied to both surfaces of a strip copper foil having a thickness of 8 μm as a negative electrode collector and dried. Then, the anode active material layer thus formed was subjected to compression molding by means of a pressing machine to prepare a strip negative electrode.

Next, alumina powder having an average particle size of about 0.3 μm, PVdF as a binder, lithium dodecylsulfate as a surfactant, and N-methylpyrrolidone as a solvent were mixed together to obtain a fine particle slurry having a viscosity in the range of from 0.1 to 3.5 Pa·sec shown in the Table 1 below. Then, the fine particle slurry was applied to both surfaces of the strip negative electrode and dried, and further subjected to compression molding by means of a pressing machine to form a porous protective film having a thickness of 5 μm. The anode active material layer obtained after the molding has a thickness of 165 μm in total of both sides of the anode active material, a width of 58.5 mm, and individual lengths of 605 mm/554 mm.

[Method for Evaluation of Porous Protective Film]

With respect to each of the above-prepared negative electrodes, the number of the occurrence of repellency of the porous protective film was visually evaluated. The results are shown in Table 1.

Table 1 shows the relationship between a viscosity of the fine particle slurry and the number of the occurrence of repellency of the porous protective film.

TABLE 1

| | Example 1 | Example 2 | Example 3 | Example 4 | Example 5 | Example 6 | Example 7 |
|---|---|---|---|---|---|---|---|
| Viscosity of fine particle slurry (Pa·sec) | 0.10 | 0.20 | 0.30 | 0.50 | 0.75 | 1.00 | 3.50 |
| Number of repellency (per 25 cm$^2$) | 8 | 7 | 7 | 5 | 2 | 2 | 1 |

From the Table 1, the following findings are obtained.

With respect to the fine particle slurry having a viscosity in the range of from 0.1 to 3.5 Pa·sec, by increasing the viscosity of the slurry, the number of the occurrence of repellency can be reduced. From the viewpoint of facilitating the step for applying the fine particle slurry, it is preferred that the viscosity of the slurry is about 0.2 to 1.0 Pa·sec.

Example 8

A negative electrode was first prepared as follows. 98 Parts by mass of soft graphite as an anode active material, and 1 part by mass of a styrene-butadiene rubber (SBR) and 1 part by mass of CMC as binders were mixed together to prepare a cathode mixture. The resultant cathode mixture was dispersed in ion-exchanged water as a solvent to prepare a cathode mixture slurry. Then, the cathode mixture slurry was applied to both surfaces of a strip copper foil having a thickness of 8 μm as a negative electrode collector and dried. Then, the anode active material layer thus formed was subjected to compression molding by means of a pressing machine to prepare a strip negative electrode.

Next, 10 parts by mass of alumina powder having an average particle size of about 0.3 μm, 2 parts by mass of PVdF as a binder, 0.1 part by mass of lithium dodecylsulfate as a surfactant, and 87.9 parts by mass of N-methylpyrrolidone as a solvent were mixed together to obtain a fine particle slurry having a viscosity of 0.20 Pa·sec. Then, the fine particle slurry was applied to both surfaces of the strip negative electrode and dried, and further subjected to compression molding by means of a pressing machine to form a porous protective film having a thickness of 5 μm. The anode active material layer obtained after the molding has a thickness of 165 μm in total of both sides of the anode active material, a width of 58.5 mm, and individual lengths of 605 mm/554 mm.

Next, a positive electrode was prepared as follows. 96.7 Parts by mass of LiCoO$_2$ as a cathode active material, 1.3 part by mass of graphite as a conductor, and 2.0 parts by mass of PVdF as a binder were mixed together to prepare an anode mixture. The resultant anode mixture was dispersed in N-methylpyrrolidone to prepare an anode mixture slurry. Then, the anode mixture slurry was uniformly applied to both surfaces of a strip aluminum foil having a thickness of 15 μm as a positive electrode collector and dried to form a cathode active material layer, followed by compression molding, preparing a strip positive electrode. In the strip positive electrode, the cathode active material layer obtained after the molding has a thickness of 165 μm in total of both sides, a width of 57.5 mm, and individual lengths of 565 mm/552 mm.

Using the strip negative electrode and strip positive electrode thus prepared and a microporous polypropylene film having a thickness of 18 μm and a width of 60.3 mm as a separator, the negative electrode, separator, positive electrode, and separator were stacked in this order to form a stacked electrode structure having a four-layer structure. Then, the stacked electrode structure was spirally wound many times in the longitudinal direction so that the negative electrode faced the inside, and the end of the separator positioned as the outermost layer was fixed with a tape, thus forming a spirally-wound electrode body. The spirally-wound electrode body has an outer diameter of about 17.4 mm.

The spirally-wound electrode body thus formed was placed in a battery can made of nickel-plated iron, and insulating sheets were respectively put on the upper and lower sides of the spirally-wound electrode body. Then, for current collection for the negative electrode and positive electrode, a lead made of aluminum was electrically derived from the positive electrode collector and welded to a battery cap, and a negative electrode lead made of nickel was electrically derived from the negative electrode collector and welded to the battery can. Then, 4.4 g of a non-aqueous electrolytic solution obtained by dissolving LiPF$_6$ in a 1:1 (volume ratio) mixed solvent of propylene carbonate and diethyl carbonate was injected into the battery can containing therein the spirally-wound electrode body so that the spirally-wound electrode body was impregnated with the electrolytic solution. Then, the battery cap was fixed by caulking the battery can through an insulating sealing gasket to hermetically seal the battery, thus preparing a cylindrical non-aqueous electrolyte secondary battery having a diameter of 18 mm and a height of 65 mm.

Comparative Example 1

A non-aqueous electrolyte secondary battery was prepared in substantially the same manner as in Example 8 except that a fine particle slurry was prepared without adding a surfactant, specifically, 10 parts by mass of alumina powder, 2 parts by mass of PVdF as a binder, and 88 parts by mass of N-methylpyrrolidone as a solvent were mixed together to prepare a fine particle slurry.

Example 9

A non-aqueous electrolyte secondary battery was prepared in substantially the same manner as in Example 8 except that the thickness of the porous protective film was changed to 0.1 μm.

Example 10

A non-aqueous electrolyte secondary battery was prepared in substantially the same manner as in Example 8 except that the thickness of the porous protective film was changed to 1 μm.

Example 11

A non-aqueous electrolyte secondary battery was prepared in substantially the same manner as in Example 8 except that the thickness of the porous protective film was changed to 10 μm.

Example 12

A non-aqueous electrolyte secondary battery was prepared in substantially the same manner as in Example 8 except that the thickness of the porous protective film was changed to 200 µm.

Comparative Example 2

A non-aqueous electrolyte secondary battery was prepared in substantially the same manner as in Example 8 except that the porous protective film was not formed on the surface of the anode active material layer, and that a separator having a thickness of 20 µm was used.

[Evaluation of Internal Short-Circuiting Rate]

With respect to each of the above-prepared batteries, fine Ni metal pieces were placed in the battery and a physical internal short-circuiting rate was determined as follows. Immediately after the preparation, the battery was first charged and allowed to stand for one week. After one week, an open circuit voltage was measured, and, when the open circuit voltage measured was equal to or lower than a reference voltage, a judgment "internal short-circuiting occurred" was made, and, based on the judgment, an internal short-circuiting rate {=(Number of battery or batteries in which internal short-circuiting occurred)/(Total number of batteries evaluated)×100} was determined. The results are shown in Table 2.

Table 2 shows the relationship between a thickness of the porous protective film and an internal short-circuiting rate.

TABLE 2

|  | Example 8 | Comparative Example 2 | Example 9 | Example 10 | Example 11 | Example 12 | Comparative Example 1 |
|---|---|---|---|---|---|---|---|
| Thickness of porous protective film (µm) | 5 | 5 | 0.1 | 1 | 10 | 200 | — |
| Use of surfactant | Used | Not used | Used | Used | Used | Used | — |
| Internal short-circuiting rate (%) | 1.0 | 14.0 | 9.0 | 2.5 | 0.0 | 0.0 | 18.5 |

From the Table 2, the following findings are obtained.

(a) With respect to the batteries in Examples 8 to 12 in which the porous protective film was formed on the surface of the active material layer, the internal short-circuiting rate is low, as compared to that of the battery in Comparative Example 1 in which the porous protective film was not formed on the surface of the active material layer.

(b) From a comparison in internal short-circuiting rate between the batteries in Example 8 and Comparative Example 2 in which the thickness of the porous protective film is the same, i.e., 5 µm, the internal short-circuiting rate of the battery in Example 8, in which a surfactant was used, is low, as compared to that of the battery in Comparative Example 2 in which a surfactant was not used. The reason for this resides in that the use of surfactant prevented the occurrence of repellency of the slurry on the surface of the electrode.

(c) The larger the thickness of the porous protective film, the lower the internal short-circuiting rate. Specifically, with respect to the battery having a porous protective film containing a surfactant, when the thickness of the porous protective film is 5 µm or larger, the internal short-circuiting rate is 1% or less, and, when the thickness of the porous protective film is 10 µm or larger, the internal short-circuiting rate is 0%.

As can be seen from the above results, from the viewpoint of preventing the occurrence of internal short-circuiting in the battery, it is preferred that the porous protective film is formed on the surface of the active material layer. It is preferred that the fine particle slurry forming a porous protective film contains a surfactant. Further, the porous protective film containing a surfactant preferably has a thickness of 5 µm or more, more preferably 10 µm or more.

Examples 13 to 20

Batteries were individually prepared in substantially the same manner as in Example 8 except that a porous protective film was formed on the surface of the anode active material layer so that the porous protective film had a gas permeability in the range of from 4 to 680 sec/100 ml as shown in the Table 3 below. A gas permeability was measured using a Gurley type densometer, manufactured and sold by Toyo Seiki Seisaku-Sho, Ltd.

Comparative Example 3

A non-aqueous electrolyte secondary battery was prepared in substantially the same manner as in Example 8 except that the porous protective film was not formed on the surface of the anode active material layer, and that a separator having a thickness of 20 µm was used.

[Evaluation of Cycle Characteristics]

With respect to each of the above-prepared batteries, cycle characteristics were evaluated as follows. Specifically, a cycle test was conducted in which a cycle of a charging operation and a discharging operation was repeated, and a discharge capacity retention ratio (%) after the 500th cycle {=(Discharge capacity at 500th cycle)/(Discharge capacity at 1st cycle)×100} was determined. The results are shown in Table 3.

Table 3 shows a gas permeability of the porous protective film and a discharge capacity retention ratio after the 500th cycle.

TABLE 3

|  | Example 13 | Example 14 | Example 15 | Example 16 | Example 17 | Example 18 | Example 19 | Example 20 | Comparative Example 3 |
|---|---|---|---|---|---|---|---|---|---|
| Gas permeability (sec/100 ml) | 4 | 10 | 50 | 100 | 300 | 450 | 600 | 680 | 300 |
| Discharge capacity retention ratio (%) | 89 | 88 | 86 | 85 | 80 | 76 | 72 | 47 | 81 |

From the Table 3, the following findings are obtained.

(a) With respect to the batteries in Examples 13 to 20 in which the porous protective film was formed on the surface of the active material layer, when the gas permeability is 300 sec/100 ml or less, the discharge capacity retention ratio is substantially equal to or higher than that in Comparative Example 3.

(b) With respect to the batteries in Examples 13 to 20 in which the porous protective film was formed on the surface of the active material layer, the higher the gas permeability, the lower the discharge capacity retention ratio after the 500th cycle. Specifically, when the gas permeability of the porous protective film falls in the range of from 4 to 600 sec/100 ml, the discharge capacity retention ratio tends to be gradually lowered as the gas permeability increases. When the gas permeability is more than 600 sec/100 ml, the discharge capacity retention ratio is drastically lowered, and, when the gas permeability is 680 sec/100 ml, the capacity retention ratio is as low as 47%. That is, 600 sec/100 ml is considered to be a critical value of the gas permeability.

As can be seen from the above results, from the viewpoint of preventing lowering of the battery properties due to the porous protective film, it is preferred that the porous protective film has a gas permeability in the range of from 4 to 300 sec/100 ml. Further, from the viewpoint of obtaining excellent capacity maintaining ratio, it is preferred that the porous protective film has a gas permeability in the range of from 4 to 600 sec/100 ml. In known batteries, the porous protective film has a gas permeability of about 680 sec/100 ml, and it has not been known that the selection of the gas permeability in the above range is effective.

Example 21

A non-aqueous electrolyte secondary battery was prepared in the same manner as in Example 8.

Examples 22 to 25

Batteries were individually prepared in substantially the same manner as in Example 8 except that the mass ratio of the binders in the fine particle slurry was changed as shown in the Table 4 below, specifically, 10 parts by mass of alumina powder, 2 parts by mass of the sum of PVdF and an acrylic rubber as binders in the mass ratio shown in Table 4, 0.1 part by mass of lithium dodecylsulfate as a surfactant, and 87.9 parts by mass of N-methylpyrrolidone as a solvent were mixed together, and a porous protective film was formed on the surface of the anode active material layer.

[Evaluation of Internal Short-Circuiting Rate]

With respect to each of the above-prepared batteries, fine Ni metal pieces were placed in the battery and a physical internal short-circuiting rate was determined as follows. In addition, the number of the active material(s) fallen and put on the porous protective film during the preparation of battery was visually checked. Immediately after the preparation, the battery was first charged and allowed to stand for one week. After one week, an open circuit voltage was measured, and, when the open circuit voltage measured was equal to or lower than a reference voltage, a judgment "internal short-circuiting occurred" was made, and, based on the judgment, an internal short-circuiting rate {=(Number of battery or batteries in which internal short-circuiting occurred)/(Total number of batteries evaluated)×100} was determined. The results are shown in Table 4.

Table 4 shows the relationship between a ratio of fluororesin to rubber resin, the number of the active material(s) fallen, and an internal short-circuiting rate.

TABLE 4

|  | Example 21 | Example 22 | Example 23 | Example 24 | Example 25 |
|---|---|---|---|---|---|
| Fluororesin:rubber resin mass ratio | 10:0 | 9:1 | 5:5 | 1:9 | 0:10 |
| Number of active material(s) fallen | 12 | 3 | 1 | 0 | 0 |
| Internal short-circuiting rate (%) | 1.1 | 0.4 | 0.0 | 0.5 | 3.7 |

From the Table 4, the following findings are obtained.

(a) The larger the mass ratio of fluororesin, the larger the number of the active material(s) fallen from the electrode, or the higher the internal short-circuiting rate.

(b) The larger the mass ratio of rubber resin, the lower the resistance to physical short-circuiting, or the higher the internal short-circuiting rate.

(c) By using a fluororesin and a rubber resin in combination as a binder, the porous protective film has both strength and flexibility, so that the internal short-circuiting rate is as low as 0.5% or less.

As can be seen from the above results, from the viewpoint of preventing the occurrence of internal short-circuiting in the battery, with respect to the binder contained in the fine particle slurry, it is preferred that the fluororesin (A):rubber resin (B) mass ratio (A:B) is 1:9 to 9:1. It is more preferred that the fluororesin (A):rubber resin (B) mass ratio (A:B) is 5:5.

Hereinabove, embodiments and Examples of the present application are described in detail, but the present application is not limited to the above embodiments and Examples, and can be changed or modified based on the technical concept of the present application.

For example, the values mentioned in the above embodiments and Examples are merely examples, and values different from them can be used if desired.

In the above Examples, an example in which the porous protective film is formed only on the negative electrode is described, but, when the porous protective film is formed only on the positive electrode or the porous protective film is formed on both the positive electrode and the negative electrode, similar effects may be obtained.

In the above embodiments and Examples, an example in which the present application is applied to the non-aqueous electrolyte secondary battery using an electrolytic solution as an electrolyte is described, but the present application can be applied to a solid electrolyte battery using a polymer solid electrolyte containing a conducting polymer compound or a mixture thereof, or can be applied to a gel electrolyte battery using a gel solid electrolyte containing a swelling solvent. Specific examples of the conducting polymer compounds contained in the polymer solid electrolyte or gel electrolyte include silicone polymers, acrylic polymers, polyacrylonitrile, polyphosphazene modified polymers, polyethylene oxide, polypropylene oxide, fluoropolymers, and composite polymers, cross-linked polymers, and modified polymers of the above compounds. Particularly, examples of the fluoropolymers include poly(vinylidene fluoride), poly(vinylidene fluoride-co-hexafluoropropylene), poly(vinylidene fluoride-co-tetrafluoroethylene), and poly(vinylidene fluoride-co-trifluoroethylene). Examples of lithium salts include LiCl, LiClO$_4$, LiAsF$_6$, LiPF$_6$, LiBF$_4$, LiB(C$_6$H$_5$)$_4$, LiBr, CH$_3$SO$_3$Li, CF$_3$SO$_3$Li, and N(C$_n$F$_{2n+1}$SO$_2$)$_2$Li, and these can be used individually or in combination. Of these, LiPF$_6$ is preferably mainly used.

As described above, according to embodiment of the present application, the occurrence of physical internal short-circuiting due to exposure of the electrode surface can be prevented, thus achieving a non-aqueous electrolyte secondary battery having high reliability.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte secondary battery comprising:
    a positive electrode;
    a negative electrode;
    an electrolyte; and
    a porous protective film formed on both surfaces of each of the positive and negative electrodes,
    wherein the porous protective film is a single layer that includes a binder, fine particles, and a surfactant selected from the group consisting of sodium dodecylsulfate, lithium dodecylsulfate and sodium hexametaphosphate, the porous protective film having a thickness of 10 μm to 200 μm, and
    wherein the surfactant is contained within the porous protective film.

2. The non-aqueous electrolyte secondary battery according to claim 1, wherein the fine particles includes a metal oxide.

3. The non-aqueous electrolyte secondary battery according to claim 2, wherein the metal oxide includes at least one member selected from the group consisting of alumina, titania, zirconia, and silica.

4. The non-aqueous electrolyte secondary battery according to claim 1, wherein the binder includes a fluororesin and a rubber resin.

5. The non-aqueous electrolyte secondary battery according to claim 4, wherein the fluororesin is polyvinylidene fluoride, and
    wherein the rubber resin includes at least one member selected from the group consisting of a styrene-butadiene rubber, an acrylic rubber, and a butadiene rubber.

6. The non-aqueous electrolyte secondary battery according to claim 4, wherein the fluororesin (A):rubber resin (B) mass ratio (A:B) is 1:9 to 9:1.

7. The non-aqueous electrolyte secondary battery according to claim 1, wherein a content of the surfactant in a slurry used to form the porous protective film ranges from 0.01 to 3.0 by mass %.

8. The non-aqueous electrolyte secondary battery according to claim 2, wherein the fine particles are insulating fine particles.

9. The non-aqueous electrolyte secondary battery according to claim 2, wherein the fine particles have a particle diameter of 0.1 to 50 micrometers.

10. The non-aqueous electrolyte secondary battery according to claim 1, wherein the porous protective film has a gas permeability of 4 to 600 sec/100 ml.

11. The non-aqueous electrolyte secondary battery according to claim 1, wherein the fine particles are not aggregated.

12. The non-aqueous electrolyte secondary battery according to claim 1, wherein the surfactant is lithium dodecylsulfate.

13. The non-aqueous electrolyte secondary battery according to claim 1, wherein the porous protective film consists essentially of the fine particles, the binder and the surfactant and the fine particles are not aggregated.

14. The non-aqueous electrolyte secondary battery according to claim 1, wherein the surfactant, the binder, the fine particles and a solvent are mixed together to form a fine particle slurry.

15. The non-aqueous electrolyte secondary battery according to claim 1, wherein a content of the surfactant in a slurry used to form the porous protective film ranges from 0.05 to 1.0 by mass %.

* * * * *